(12) United States Patent
Kang et al.

(10) Patent No.: US 12,219,127 B2
(45) Date of Patent: Feb. 4, 2025

(54) VIDEO ENCODING AND DECODING BASED ON RESAMPLING CHROMA SIGNALS

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(*) Notice: Subject to any disclaimer, the term of this patent is extended or adjusted under 35 U.S.C. 154(b) by 18 days.

(21) Appl. No.: 17/797,255

(22) PCT Filed: Feb. 17, 2021

(86) PCT No.: PCT/KR2021/002011
§ 371 (c)(1),
(2) Date: Aug. 3, 2022

(87) PCT Pub. No.: WO2021/167340
PCT Pub. Date: Aug. 26, 2021

(65) Prior Publication Data
US 2023/0058283 A1    Feb. 23, 2023

(30) Foreign Application Priority Data

Feb. 17, 2020  (KR) .................. 10-2020-0018864
Mar. 2, 2020   (KR) .................. 10-2020-0025838
Feb. 17, 2021  (KR) .................. 10-2021-0021015

(51) Int. Cl.
*H04N 19/105*  (2014.01)
*H04N 19/132*  (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
None
See application file for complete search history.

(56) References Cited

U.S. PATENT DOCUMENTS 9,813,723 B2   11/2017  Chen et al.
10,499,068 B2  12/2019  Hannuksela
(Continued)

FOREIGN PATENT DOCUMENTS

KR   20160002898 A   1/2016
KR   20170101983 A   9/2017
(Continued)

OTHER PUBLICATIONS

Bross, Benjamin et al.; "Versatile Video Coding (Draft 8)"; Joint Video Experts Team (JVET) of ITU-T SG 16 WP 3 and ISO/IEC JTC 1/SC 29/WG 11; 17th Meeting: Brussels, BE, Jan. 7-17, 2020 (511 pages).
(Continued)

*Primary Examiner* — Chikaodili E Anyikire
(74) *Attorney, Agent, or Firm* — Lempia Summerfield Katz LLC

(57) ABSTRACT

Disclosed is a video encoding/decoding method for performing inter-prediction on a current picture by resampling and referring to luma signals and chroma signals of a reference
(Continued)

picture to improve encoding efficiency in video encoding and decoding for a frame having luma signals and chroma signals in various sample formats in one video sequence.

6 Claims, 20 Drawing Sheets

(51) Int. Cl.
　　*H04N 19/159* (2014.01)
　　*H04N 19/176* (2014.01)
　　*H04N 19/186* (2014.01)
　　*H04N 19/46* (2014.01)

(52) U.S. Cl.
　　CPC ......... *H04N 19/176* (2014.11); *H04N 19/186* (2014.11); *H04N 19/46* (2014.11)

(56) References Cited

U.S. PATENT DOCUMENTS

| | | | |
|---|---|---|---|
| 11,330,279 | B2 | 5/2022 | Hannuksela |
| 11,711,519 | B2* | 7/2023 | Li .................... H04N 19/159 375/240.02 |
| 2014/0328398 | A1 | 11/2014 | Chen et al. |
| 2016/0191931 | A1 | 6/2016 | Hannuksela |
| 2017/0347026 | A1 | 11/2017 | Hannuksela |
| 2019/0028701 | A1 | 1/2019 | Yu et al. |
| 2019/0313021 | A1 | 10/2019 | Hannuksela |
| 2020/0077105 | A1 | 3/2020 | Hannuksela |
| 2020/0177809 | A1 | 6/2020 | Hannuksela |
| 2021/0195179 | A1* | 6/2021 | Coban .................. H04N 19/186 |
| 2021/0195223 | A1* | 6/2021 | Chang .................. H04N 19/137 |
| 2022/0094954 | A1* | 3/2022 | Chen .................... H04N 19/33 |
| 2022/0394301 | A1* | 12/2022 | Deshpande .......... H04N 19/172 |
| 2023/0046994 | A1* | 2/2023 | Zhang ................... H04N 19/70 |

FOREIGN PATENT DOCUMENTS

| | | |
|---|---|---|
| KR | 20190009378 A | 1/2019 |
| WO | 2019023200 A1 | 1/2019 |

OTHER PUBLICATIONS

International Search Report issued in related Application No. PCT/KR2021/002011 (6 pages).
European Search Report cited in European patent application No. 21757488.8; Mar. 4, 2024; 9 pp.
ITU-T REC. H.263, Video coding for low bit rate communication, Series H: Audiovisual and Multimedia Systems Infrastructure of audiovisual services—Coding of moving video, Jan. 2005, 226 pp.
Peisong Chen et al., AHG 8: Adaptive Resolution Change, JVET-O0303-v2, Joint Video Experts Team (JVET) of ITU-T SG 16 WP 3 and ISO/IEC JTC 1/SC 29/WG 11; 15th Meeting: Gothenburg, SE, Jul. 3-12, 2019 (8 pages).

* cited by examiner

VIDEO ENCODING AND DECODING BASED ON RESAMPLING CHROMA SIGNALS

CROSS-REFERENCE TO RELATED APPLICATIONS

This application is a U.S. national stage of International Application No. PCT/KR2021/002011, filed on Feb. 17, 2021, which claims priority to Korean Patent Application No. 10-2020-0018864 filed on Feb. 17, 2020, Korean Patent Application No. 10-2020-0025838 filed on Mar. 2, 2020, and Korean Patent Application No. 10-2021-0021015 filed on Feb. 17, 2021, the entire disclosures of each of which are incorporated herein by reference.

TECHNICAL FIELD

The present disclosure relates to image (video) encoding and decoding, and more specifically, relates to a video encoding/decoding method for performing inter-prediction on a current picture by resampling and referring to luma signals and chroma signals of reference pictures having various sampling formats.

BACKGROUND

The statements in this section merely provide background information related to the present disclosure and may not constitute prior art.

Since the volume of video data is larger than that of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and thus the amount of data to be encoded is also increasing. Accordingly, a new compression technique having better encoding efficiency and higher image quality than the existing compression technique is required.

In image (video) encoding/decoding, a current picture may be encoded/decoded with reference to a previously decoded image in order to improve encoding efficiency. For example, in the case of video encoding/decoding of a frame having luma signals and chroma signals in various chroma formats (e.g., 4:4:4, 4:2:2, and 4:2:0) in one video sequence, luma signals and chroma signals of a current picture may have a different resolution from that of luma signals and chroma signals of a reference picture. In this case, a method of encoding/decoding the current picture by correcting the resolution of the reference picture is required.

SUMMARY

In order to improve encoding efficiency in video encoding and decoding for frames having luma signals and chroma signals in various sampling formats in one video sequence, the present disclosure performs inter-prediction on a current picture by resampling and referring to luma signals and chroma signals of a reference picture. An object of the present disclosure is to provide a video encoding/decoding method for reducing memory consumption and delay in an encoding/decoding process.

One aspect of the present disclosure provides a video decoding method for a current block in a current picture including chroma signals having a resolution and a chroma format separate from luma signals, performed by a video decoding device. The video decoding method comprises obtaining size information and a chroma format of the current picture and generating a resolution for the chroma signals of the current picture from the size information and the chroma format. The video decoding method also comprises obtaining decoded residual signals and inter-prediction information regarding the current block, wherein the inter-prediction information includes a reference picture index and a motion vector. The video decoding method also comprises obtaining a resolution and a chroma format for chroma signals of a reference picture designated by the reference picture index. The video decoding method also comprises when the resolution or the chroma format for the chroma signals of the current picture is different from the resolution or the chroma format for the chroma signals of the reference picture, resampling the chroma signals of the reference picture to match the resolution and the chroma format for the chroma signals of the reference picture and the resolution and the chroma format for the chroma signals of the current picture. The video decoding method also comprises generating predicted signals for the current block based on the inter-prediction information. The video decoding method also comprises generating a reconstructed block by adding the predicted signals to the residual signals.

Another aspect of the present disclosure provides a video encoding method for a current block in a current picture including chroma signals having a resolution and a chroma format separate from luma signals, performed by a video encoding device. The video encoding method comprises obtaining size information and a chroma format of the current picture and generating a resolution for the chroma signals of the current picture from the size information and the chroma format. The video encoding method comprises obtaining inter-prediction information regarding the current block, wherein the inter-prediction information includes a reference picture index and a motion vector. The video encoding method comprises obtaining a resolution and a chroma format for chroma signals of a reference picture designated by the reference picture index. The video encoding method comprises when the resolution or the chroma format of the chroma signals of the current picture is different from the resolution or the chroma format of the chroma signals of the reference picture, resampling the chroma signals of the reference picture to match the resolution and the chroma format of the chroma signals of the reference picture and the resolution or the chroma format of the chroma signals of the current picture. The video encoding method comprises generating predicted signals for the current block based on the inter-prediction information. The video encoding method comprises generating residual signals by subtracting the predicted signals from the current block.

As described above, according to the present embodiment, it is possible to improve encoding efficiency by providing a video encoding/decoding method for performing inter-prediction on a current picture by resampling and referring to luma signals and chroma signals of a reference picture in video encoding and decoding for a frame having luma signals and chroma signals in various sample formats in one video sequence.

In addition, according to the present embodiment, it is possible to decrease a bit rate for various contents such as game broadcasting, 360-degree video streaming, VR/AR videos, and online lectures, reduce the burden on a network and energy consumption of a reproduction device performing video decoding, and enable rapid decoding by providing a video encoding/decoding method for reducing memory consumption and delay in encoding/decoding processes.

DETAILED DESCRIPTION

Figure 1:
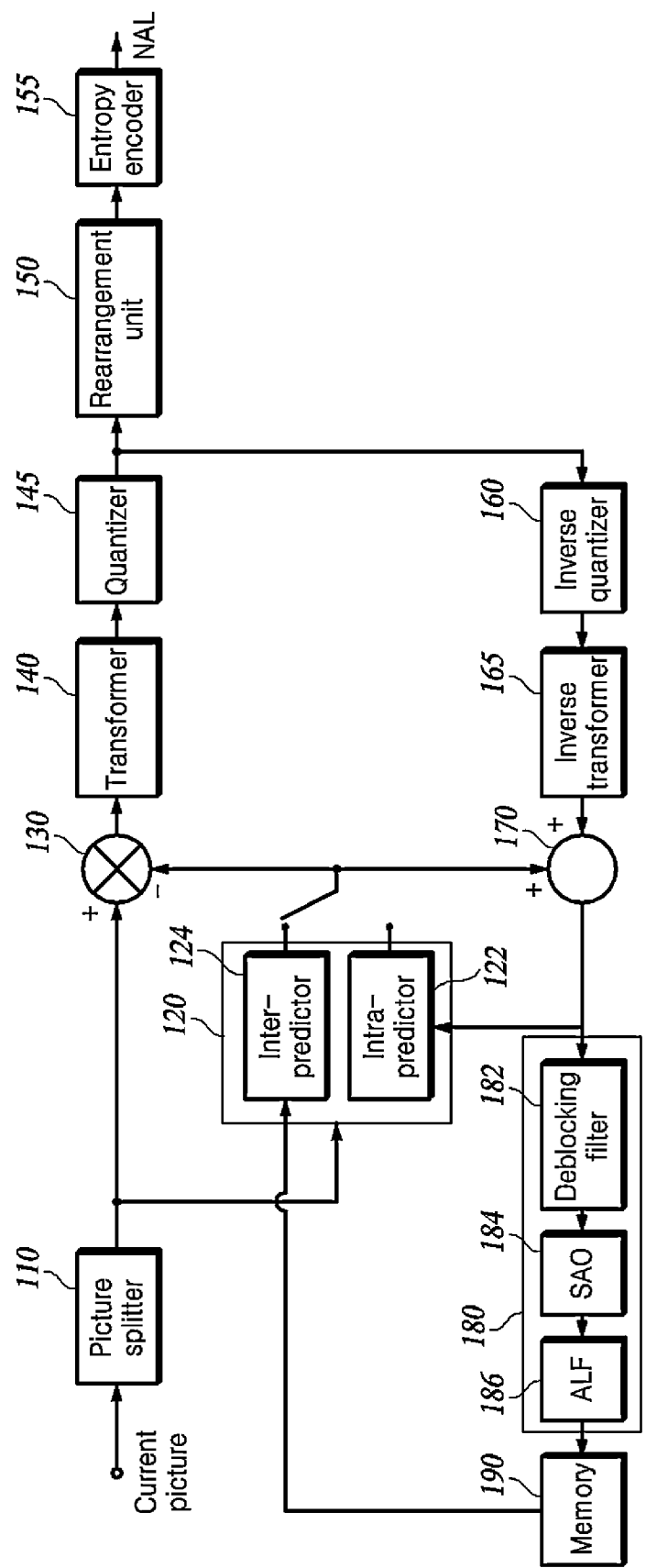
FIG. 1 is a block diagram for a video encoding apparatus which may implement technologies of the present disclosure.

Hereinafter, embodiments of the present disclosure are described in detail with reference to drawings. When reference numerals refer to components of each drawing, it should be noted that although the same or equivalent components are illustrated in different drawings, the same or equivalent components may be denoted by the same reference numerals. Further, in describing the embodiments, a detailed description of known related configurations and functions may be omitted to avoid unnecessarily obscuring the subject matter of the embodiments FIG. 1 is a block diagram for a video encoding apparatus which may implement technologies of the present disclosure. Hereinafter, referring to illustration of FIG. 1, the video encoding apparatus and sub-components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop-filter unit 180, and a memory 190.

Each component of the encoding apparatus may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information (CTU size) on the size of the CTU is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size, a binarytree (BT) in which the higher node is split into two lower nodes, a ternarytree (TT) in which the higher node is split into three lower nodes at a ratio of 1:2:1, or a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
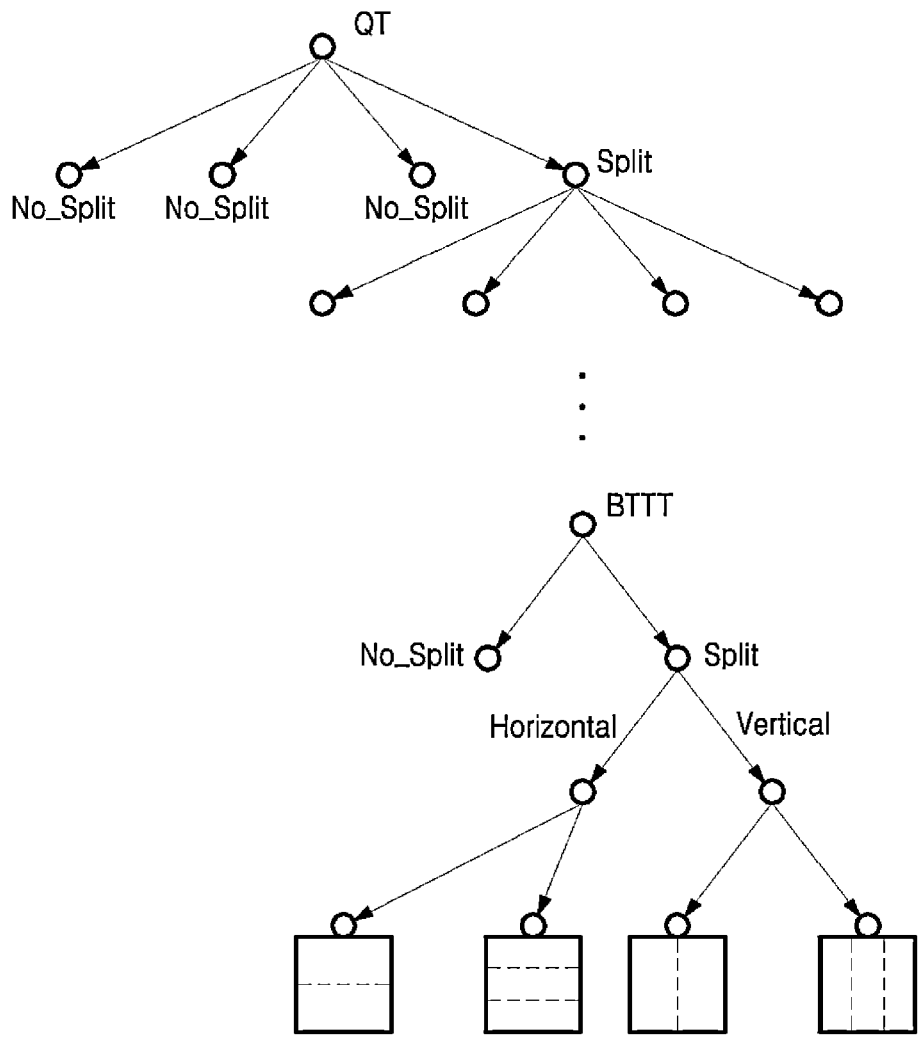
FIG. 2 is a diagram for describing a method for splitting a block by using a QTBTTT structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT spitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the coding unit (CU), which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding block is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). Inter prediction includes both unidirectional prediction and bidirectional prediction.

Figure 3A:
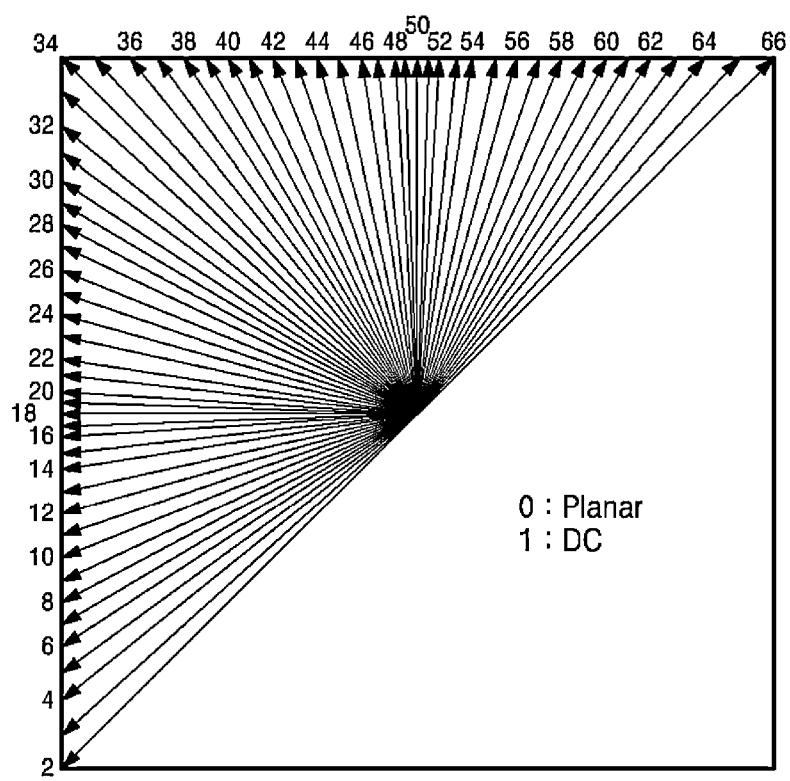
FIGS. 3A and 3B are diagrams illustrating a plurality of intra prediction modes including wide angle intra prediction modes.

The intra predictor 122 predicts pixels in the current block by using pixels (reference pixels) positioned on a neighboring of the current block in the current picture including the current block. There are a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
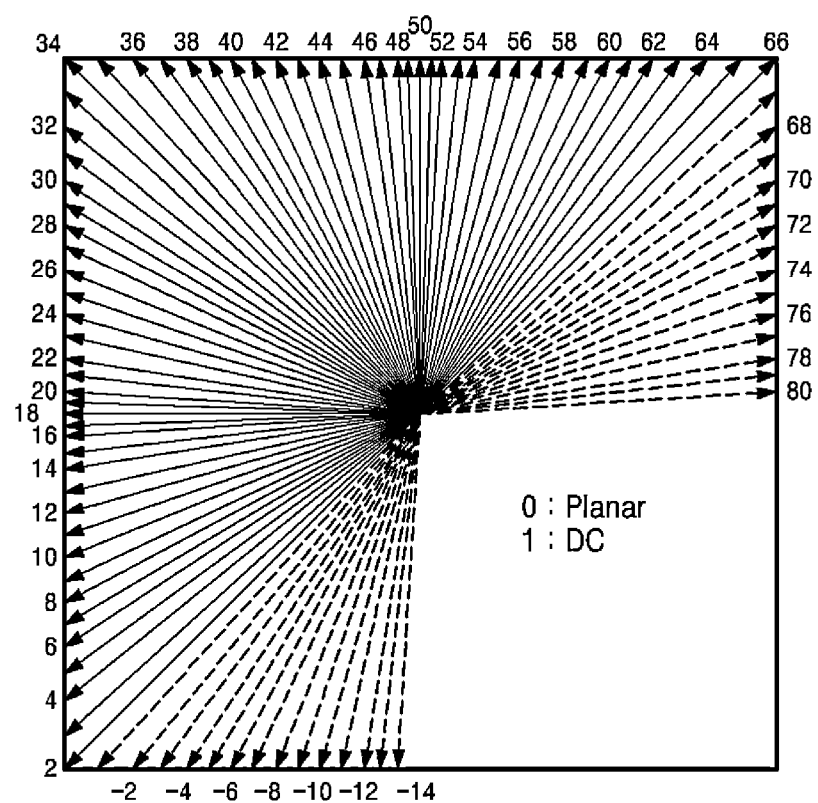

For efficient directional prediction for the current block having the rectangular shape, directional modes (#67 to #80, intra prediction modes #−1 to #−14) illustrated as dotted arrows in FIG. 3B may be additionally used. The direction modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component and a motion vector calculated based on the luma component is used for both luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a differential motion vector to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
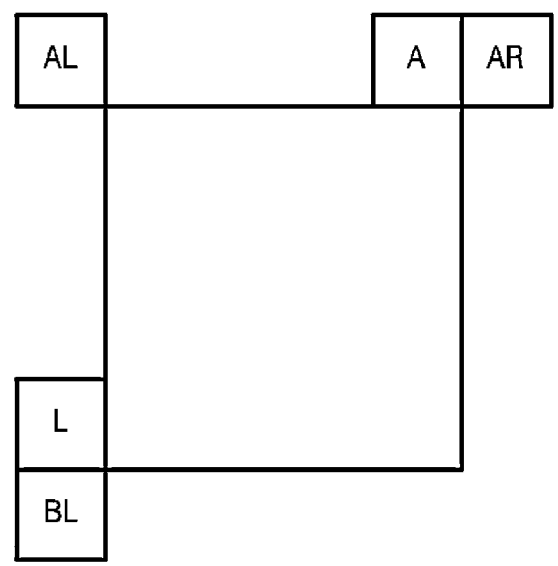
FIG. 4 is a diagram for a neighboring block of a current block.

As a neighboring block for deriving the merge candidate, all or some of a left block L, a top block A, a top right block AR, a bottom left block BL, and a top left block AL adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

Another method for encoding the motion information is an advanced motion vector prediction (AMVP) mode.

In the AMVP mode, the inter predictor 124 derives prediction motion vector candidates for the motion vector of the current block by using the neighboring blocks of the current block. As a neighboring block used for deriving the prediction motion vector candidates, all or some of a left block L, a top block A, a top right block AR, a bottom left block BL, and a top left block AL adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the prediction motion vector candidates. For example, a co-located block with the current block within the reference picture or blocks adjacent to the co-located block may be used.

The inter predictor 124 derives the prediction motion vector candidates by using the motion vector of the neighboring blocks and determines the prediction motion vector for the motion vector of the current block by using the prediction motion vector candidates. In addition, a differential motion vector is calculated by subtracting the prediction motion vector from the motion vector of the current block.

The prediction motion vector may be acquired by applying a pre-defined function (e.g., center value and average value computation, etc.) to the prediction motion vector candidates. In this case, the video decoding apparatus also knows the pre-defined function. Further, since the neighboring block used for deriving the prediction motion vector candidate is a block in which encoding and decoding are already completed, the video decoding apparatus may also already know the motion vector of the neighboring block. Therefore, the video encoding apparatus does not need to encode information for identifying the prediction motion vector candidate. Accordingly, in this case, information on the differential motion vector and information on the reference picture used for predicting the current block are encoded.

Meanwhile, the prediction motion vector may also be determined by a scheme of selecting any one of the prediction motion vector candidates. In this case, information for identifying the selected prediction motion vector candidate is additional encoded jointly with the information on the differential motion vector and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of sub-blocks and perform the transform by using the sub-block as the transform unit. Alternatively, the residual block is divided into two sub-blocks, which are a transform area and a non-transform area to transform the residual signals by using only the transform area sub-block as the transform unit. Here, the transform area sub-block may be one of two rectangular blocks having a size ratio of 1:1 based on a horizontal axis (or vertical axis). In this case, a flag (cu_sbt_flag) indicates that only the sub-block is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area sub-block may have a size ratio of 1:3 based on the horizontal axis (or vertical axis), and in this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the differential motion vector) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block are used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The filter unit 180 as an in-loop filter may include all or some of a deblocking filter 182, a sample adaptive offset (SAO) filter 184, and an adaptive loop filter (ALF) 186.

The deblocking filter 180 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
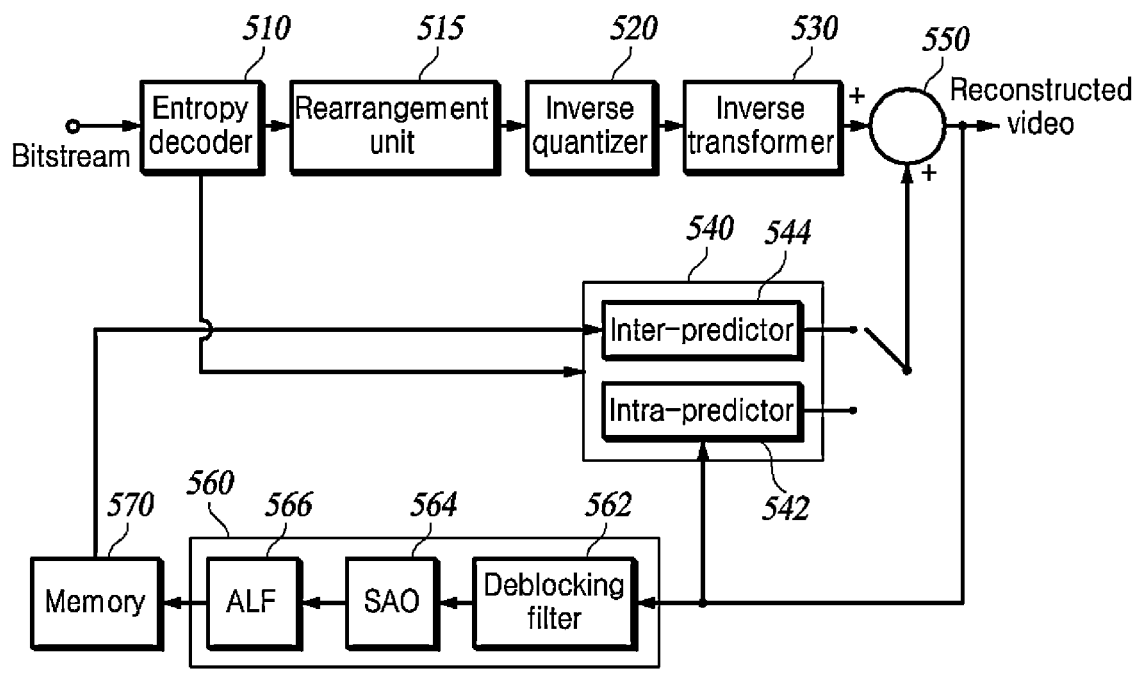
FIG. 5 is a block diagram for a video decoding apparatus which may implement the technologies of the present disclosure.

FIG. 5 is a functional block diagram for a video decoding apparatus, which may implement the technologies of the present disclosure. Hereinafter, referring to FIG. 5, the video decoding apparatus and sub-components of the apparatus are described.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similarly to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information, and information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (sub-block) of the transform block, the inverse transformer 530 extracts a flag (cu_sbt_flag) that only the sub-block of the transform block is transformed, directional (vertical/horizontal) information (cu_sbt_horizontal_flag) of the sub-block, and/or positional information (cu_sbt_pos_flag) of the sub-block. The inverse transformer 530 also inversely transforms the transform coefficients of the corresponding sub-block into the spatial domain from the frequency domain to restore the residual signals and fills an area which is not inversely transformed with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transform unit output from the inverse transform unit and the prediction block output from the inter prediction unit or the intra prediction unit. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present embodiment relates to image (video) encoding and decoding as described above. More specifically, the present embodiment provides a video encoding/decoding method for performing inter-prediction on a current picture by resampling and referring to luma signals and chroma signals of a reference picture to improve encoding efficiency in video encoding and decoding for a frame having luma signals and chroma signals in various sample formats in one video sequence.

In the following description according to the present disclosure, it is assumed that memories 190 and 570 of the video encoding/decoding device as shown in FIGS. 1 and 5 include a decoded picture buffer (DPB).

The video encoding/decoding device as illustrated in FIGS. 1 and 5 maintains the same size of all pictures in one video sequence. Accordingly, size information of a picture is indicated on an SPS, which is a high-level syntax that defines encoding parameters of a video sequence. For example, in the SPS, pic_width_in_luma_samples and pic_height_in_luma_samples are used as syntax elements regarding a picture size.

Figure 6:
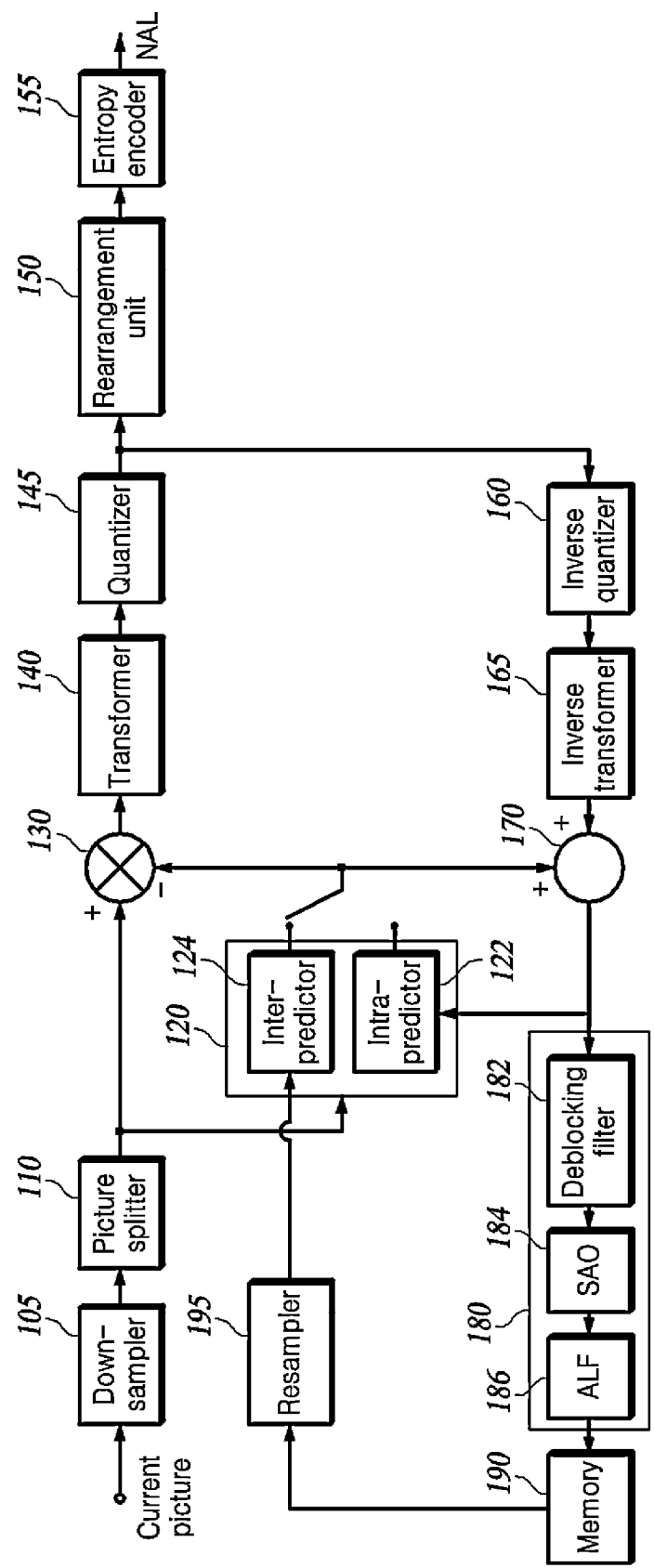
FIG. 6 shows a video encoding device including a resampling block according to an embodiment of the present disclosure.

FIG. 6 shows a video encoding device including a resampling block according to an embodiment of the present disclosure.

Figure 7:
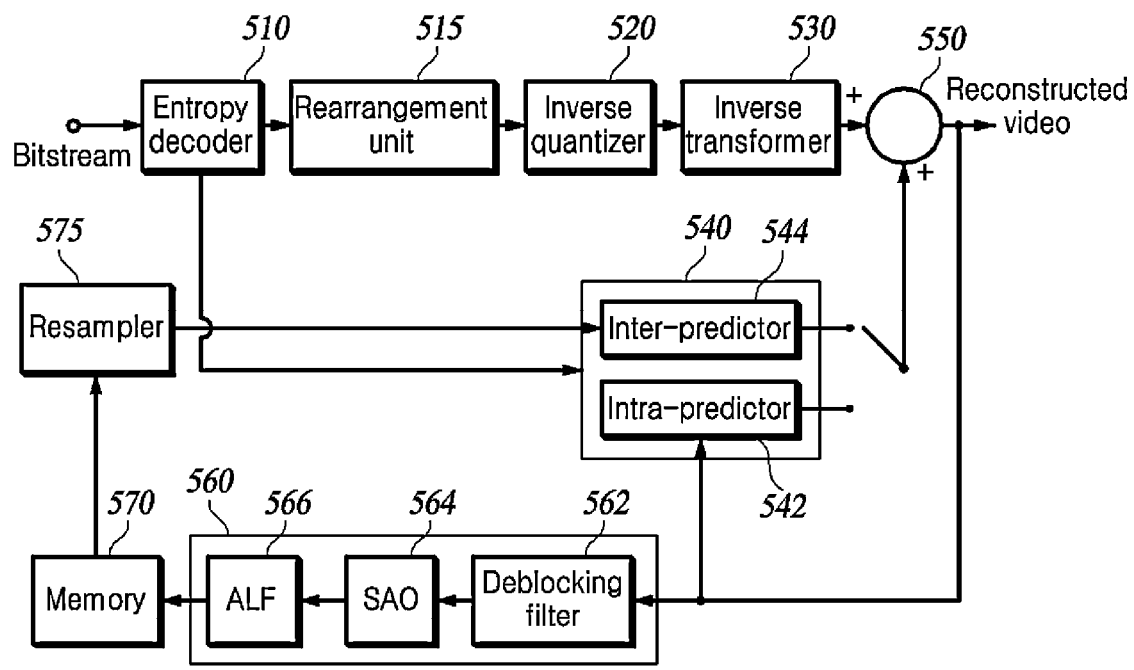
FIG. 7 shows a video decoding device including a resampling block according to an embodiment of the present disclosure.

FIG. 7 shows a video decoding device including a resampling block according to an embodiment of the present disclosure.

The resampling blocks of the video encoding/decoding devices illustrated in FIGS. 6 and 7 change the width and height of a picture included in one video sequence. In this case, applying the same resampling rate to one picture without distinction of luma/chroma is referred to as reference picture resampling (RPR).

In the example of FIG. 6, an input video frame may be down-sampled by a down-sampler 105. An output video frame obtained by encoding a previous input frame and then decoding the same is stored in a DPB in the memory 190. Here, when the next frame to be encoded is encoded at a sampling rate different from the input size of the previous video frame, the video encoding device may up-sample or down-sample frames stored in the DPB such that the frames match the rate using the resampler 195.

In the example of FIG. 7, a reference picture in the DPB in the memory 570 is stored without being resampled. However, when the sizes of the current picture and the reference picture are different, the reference picture in the DPB is up-sampled or down-sampled using a resampler 575 such that the reference picture has the same size as the current picture, and then the video decoding device may perform decoding. In a motion estimation and motion compensation process, a motion vector may also be scaled according to a size ratio and order difference of the reference picture.

To realize such RPR function, the video encoding device transmits the following syntaxes.

First, the video encoding device transmits syntax pic_width_max_in_luma_samples and pic_height_max_in_luma_samples using the SPS. Here, pic_width_max_in_luma_samples represents a maximum width of a frame to be encoded in units of luma samples, and pic_height_max_in_luma_samples represents a maximum height of the frame to be encoded in units of luma samples. The values thereof must be non-zero and integer multiples of Max(8, MinCbSizeY). MinCbSizeY indicates a minimum size of a luma block constituting a video picture.

In addition, the video encoding device specifies the size of each video frame to be decoded by transmitting syntax pic_width_in_luma_samples and pic_height_in_luma_samples using a PPS.

Further, the video encoding device transmits a syntax called res_change_in_clvs_allowed_flag (or ref pic_resampling_enabled_flag) on the SPS. When the value of this syntax is 1, it indicates that the spatial resolution of a video picture can be changed, and 0 indicates that the spatial resolution is always fixed. Accordingly, when res_change_in_clvs_allowed_flag is 0, pic_width_in_luma_samples and pic_height_in_luma_samples can be set to be the same as pic_width_max_in_luma_samples and pic_height_max_in_luma_samples.

In order to represent the size of a picture to which RPR is applied, an RPR scaling factor between a reference picture and a current picture may be used. The RPR scaling factor includes pps_scaling_win_left_offset, pps_scaling_win_right_offset, pps_scaling_win_top_offset, and pps_scaling_win_bottom_offset.

When the RPR function is used, a conventional encoding technique for encoding a block within a video frame may be changed.

For example, for a reference picture to which RPR is applied, the video decoding/encoding devices may set a restriction such that a temporal motion vector predictor (TMVP) is not used. This is because, when the size and scale factor of a co-located reference picture for extracting a TMVP are different, the position of a co-located block may be different. In addition, decoder-side motion vector refinement (DMVR) and prediction refinement with optical flow (PROF) may be limited. When RPR is applied, the video decoding/encoding devices may perform motion estimation after applying an additional down/up-sampling filter to a reference picture. In this case, a down/up-sampling filter depending on an inter-prediction mode (e.g., when affine prediction is used) of blocks may be used.

Figure 8:
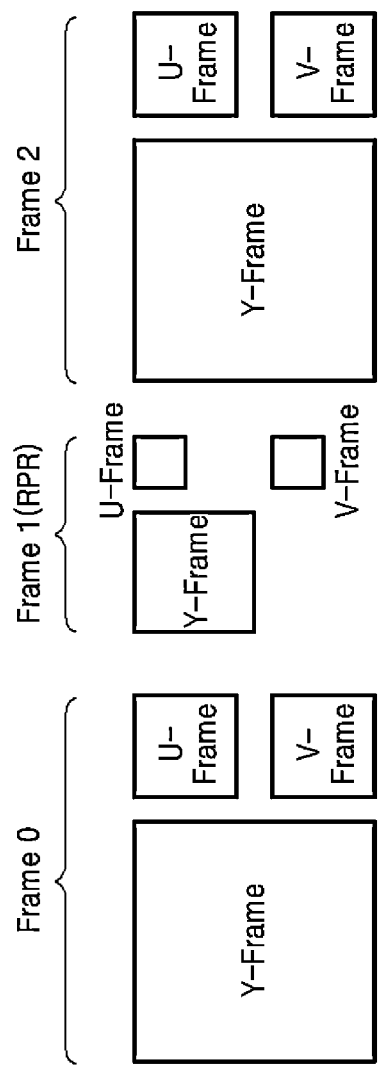
FIG. 8 is a diagram showing a frame to which RPR is applied.

Meanwhile, RPR is based on the assumption that all pictures in a sequence have the same chroma format. For example, as illustrated in FIG. 8, in the case of frame 1, a down-sampling rate of a chroma sample is determined according to a down-sampling rate of a luma sample. Accordingly, various chroma formats are not provided for each picture in one video stream. Hereinafter, a resampling method for chroma signals with respect to video pictures having various chroma formats (or sampling formats) such as 4:4:4, 4:2:2, and 4:2:0 in one video stream according to the present embodiment is described.

Figure 9:
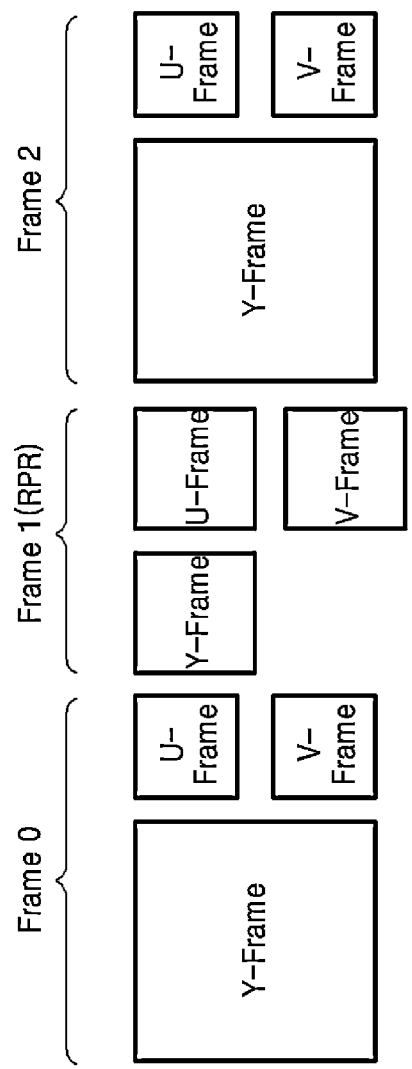
FIG. 9 is a diagram showing a reference frame having various chroma formats according to an embodiment of the present disclosure.
Figure 10:
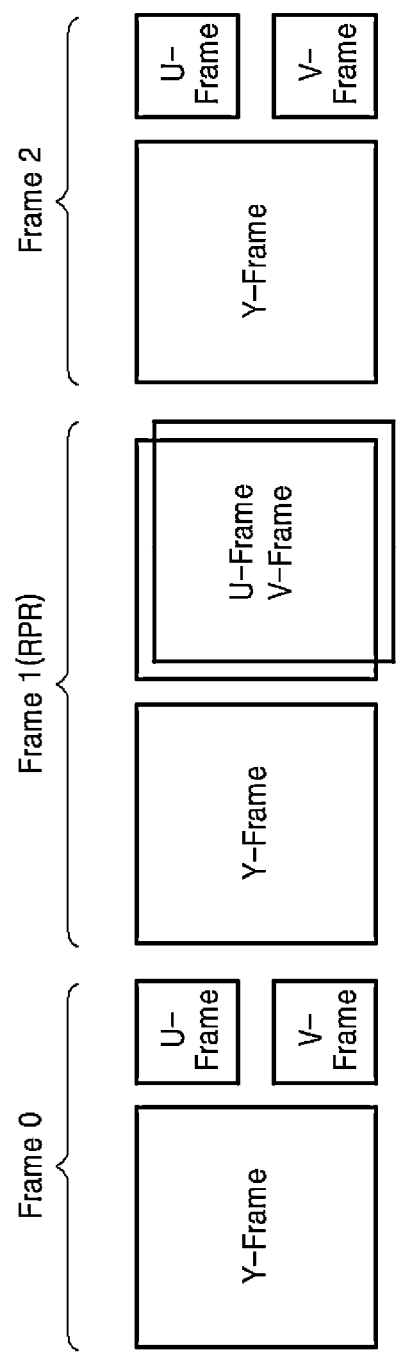
FIG. 10 is another diagram showing a reference frame having various chroma formats according to an embodiment of the present disclosure.
Figure 11:
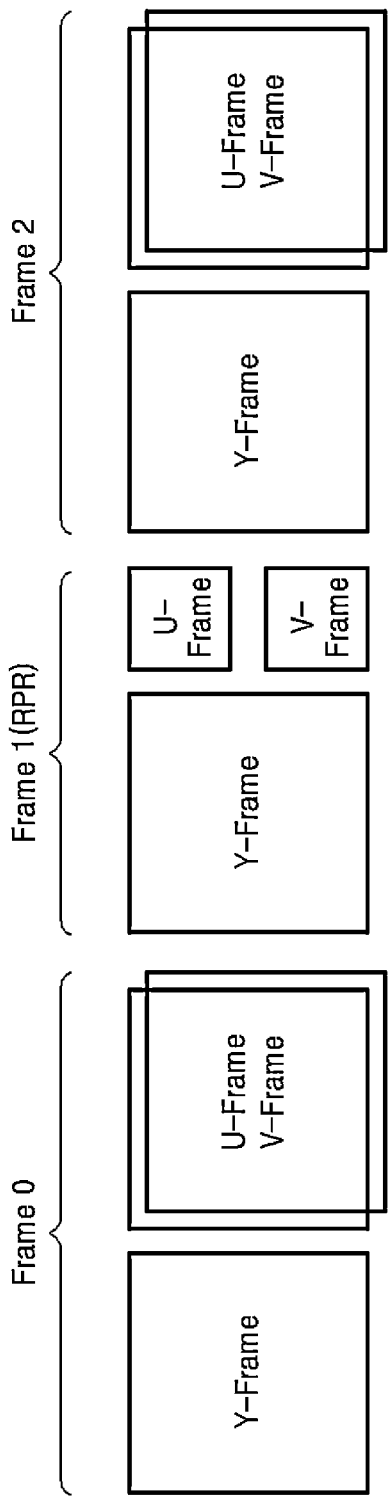
FIG. 11 is another diagram showing a reference frame having various chroma formats according to an embodiment of the present disclosure.

FIGS. 9-11 are diagrams showing reference frames having various chroma formats according to an embodiment of the present disclosure.

As illustrated in FIG. 9, the video encoding device down-samples luma signals Y with respect to a reference picture to which RPR is applied but maintains the original resolution of chroma signals U and V or resamples the chroma signals U and V at a different rate. When the chroma signals maintain the original resolution, they have the same sampling rate as the down-sampled luma signals and thus have a 4:4:4 format. When a down-sampling rate different from that of the luma signals is provided to the chroma signals, i.e., when resampling is applied only in a vertical or horizontal direction, a 4:2:2 format may be provided for the chroma signals.

As illustrated in FIG. 10, the video encoding device may provide a 4:4:4 format to chroma signals U and V by up-sampling the chroma signals U and V while maintaining the luma signals Y as it is. Even in this case, if an up-sampling rate different from that of the luma signals is provided to the chroma signals, the 4:2:2 format may be provided for the chroma signals.

For a method of using RPR in the 4:4:4 format for 4:2:0 video pictures, as illustrated in FIGS. 9 and 10, a reference picture in the 4:2:0 may be used for RPR among 4:4:4 video pictures, as illustrated in FIG. 11.

Even when independent resampling of luma signals and chroma signals is supported, the resolution of luma signals of a reference picture must be greater than or equal to the resolution of chroma signals.

In order to support separate resampling of luma signals and chroma signals, the video encoding device may add the following syntax elements.

First, the video encoding device transmits syntax pic_width_max_in_chroma_samples and pic_height_max_in_chroma_samples using the SPS. Here, pic_width_max_in_chroma_samples represents a maximum width of a frame to be encoded in units of chroma samples, and pic_height_max_in_chroma_samples represents a maximum height of the frame to be encoded in units of chroma samples. The values thereof must be non-zero and integer multiples of Max(8, MinCbSizeC). MinCbSizeC represents a minimum size of a chroma block constituting a video picture.

Alternatively, the video encoding device may derive pic_width_max_in_chroma_samples and pic_height_max_in_chroma_samples from pic_height_max_in_luma_samples and pic_width_max_in_luma_samples using a scale value indicating a sampling rate of the chroma signals.

In addition, the video encoding device specifies the size of each video frame to be decoded by transmitting syntax pic_width_in_chroma_samples and pic_chroma_in_luma_samples using the PPS.

Alternatively, the video encoding device may derive pic_width_in_chroma_samples and pic_chroma_in_luma_samples from pic_width_in_luma_samples and pic_height_in_luma_samples using a scale value indicating a sampling rate of the chroma signals.

The video encoding device may selectively additionally transmit a chroma format for one picture. For example, in the case of an image with a change in resolution, the video encoding device may transmit chroma_format_idc_for_res_change on the SPS to add a chroma format. Alternatively, additional chroma_format_idc_for_res_change may be transmitted on the PPS. Alternatively, additional chroma_format_idc_for_res_change may be transmitted on a picture head.

Further, the video encoding device transmits a syntax called res_change_in_clvs_allowed_flag (or ref pic_resampling_enabled_flag) on the SPS. When the value of this syntax is 1, it indicates that the spatial resolution of a video picture can be changed, and 0 indicates that the spatial resolution is always fixed. In this case, the res_change_in_clvs_allowed_flag value may be configured to separately indicate luma and chroma signals. Alternatively, both the luma and chroma signals may be controlled using one flag.

The video encoding device may generate a resolution of chroma signals of one picture from pic_width_in_chroma_samples, pic_chroma_in_luma_samples, a chroma format, and a scaling factor of luma signals.

Meanwhile, the video encoding device may use the same filter as a filter used to down/up-sample luma signals to down/up-sample chroma signals. For example, a DCT interpolation filter (DCTIF) used for conventional reference picture up-sampling may be used, or a Gaussian filter, a Lancoz filter, or the like may be used. In another embodiment of the present disclosure, the video encoding device may use different filters to down/up-sample chroma signals. For example, a filter having a smaller number of taps than a filter used for luma signals may be applied to chroma signals.

In addition, in the motion estimation and motion compensation process, a motion vector may also be scaled according to a size ratio of a reference picture.

When different types of resampling are used for luma signals and chroma signals, conventional encoding techniques for encoding a block in a video picture may also be changed.

With respect to 4:4:4 video signals, the video encoding device may perform encoding after converting from YUV or RGB format to another color space such as YCgCo by applying adaptive color transform (ACT). For a picture to which RPR is applied, the video encoding device may restrict use of such ACT. The details of ACT are described below.

In addition, only in a case in which a dual tree structure for independently splitting blocks for luma and chroma signals is used, the video encoding device enables separate resampling of chroma signals. Alternatively, in order to apply separate resampling to luma and chroma signals, the video encoding device uses the dual tree structure. In this case, when separate resampling is applied to luma and chroma signals, no_qtba_dual_tree_intra_constraint_flag, which is a syntax related to use of a dual tree, is always set to 0. Further, qtba_dual_tree_intra_flag is always set to 1.

In another embodiment of the present disclosure, when a luma/chroma dual tree structure is used, the video encoding device may perform resampling on luma signals. Alternatively, in order to apply resampling to luma signals, the video encoding device uses the dual tree structure.

In another embodiment of the present disclosure, when a luma/chroma dual tree structure is used, the video encoding device may perform resampling on chroma signals. Alternatively, in order to apply resampling to chroma signals, the video encoding device uses the dual tree structure.

In another embodiment of the present disclosure, when a single tree structure is used, the video encoding device adjusts the resampling rate of chroma signals according to the rate of luma signals.

In another embodiment of the present disclosure, when a split structure of an I frame in a current GOP is a dual tree structure, the video encoding device may perform separate resampling on chroma signals for all pictures that refer to the I frame or all pictures in the current GOP.

In another embodiment of the present disclosure, in the case of a single tree structure in which blocks of luma and chroma signals are not split independently, the video encoding device may perform separate resampling on chroma signals.

Meanwhile, with respect to a reference picture to which chroma signal resampling is applied, the video decoding/encoding devices may impose restrictions such that TMVP is not used. This is because, when the size and scale factor of a co-located reference picture for extracting the TMVP are different, the position of a co-located block may be different. Further, DMVR and PROF may also be restricted. When chroma signal resampling is applied, the video decoding/encoding devices may perform motion estimation after applying an additional down/up-sampling filter to a reference picture. In this case, a down/up-sampling filter depending on the inter-prediction mode of blocks (e.g., when affine prediction is used) may be applied.

In the present embodiment, chroma signal resampling performed by the video encoding device as described above may be equally applied to the video decoding device.

Figure 12:
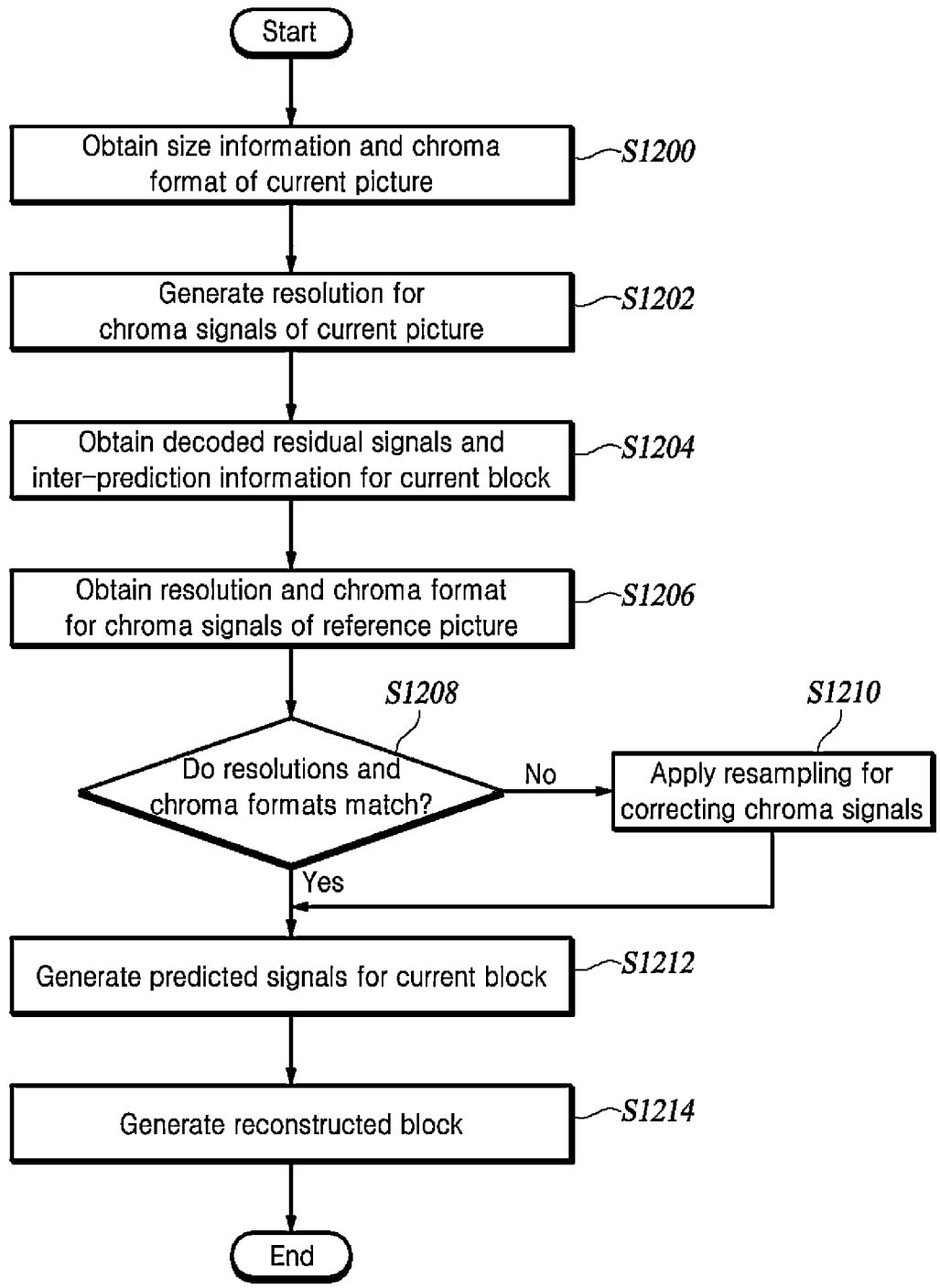
FIG. 12 is a schematic flowchart of a video decoding method according to an embodiment of the present disclosure.

FIG. 12 is a schematic flowchart of a video decoding method according to an embodiment of the present disclosure.

The example of FIG. 12 illustrates an inter-prediction process performed by the video decoding device with respect to a current block in a current picture including chroma signals having a resolution and a chroma format separate from those of luma signals.

The video decoding device obtains size information and the chroma format of the current picture (S1200). Here, the size information includes a maximum width and a maximum height of luma signals (i.e., the luma signals can have), the width and height of luma signals of the current picture, a maximum width and a maximum height of chroma signals (i.e., the chroma signals can have), the width and height of chroma signals of the current picture, a flag indicating a change in the chroma format, a flag indicating a change in resolution, and a scaling factor of the luma signals.

The video decoding device generates a resolution for the chroma signals of the current picture from the size information and the chroma format of the current picture (S1202). The resolution of the chroma signals of the current picture may be generated from the width and height of the chroma signals of the current picture, the chroma format, the scaling factor of the luma signals, and the like.

The video decoding device obtains decoded residual signals and inter-prediction information for the current block (S1204). Here, the inter-prediction information includes a reference picture index and a motion vector.

The video decoding device obtains a resolution and a chroma format of chroma signals of a reference picture designated by the reference picture index (S1206).

The video decoding device checks whether the resolution and the chroma format of the chroma signals of the current picture match the resolution and the chroma format of the chroma signals of the reference picture (S1208).

When the resolution or chroma format of the chroma signals of the current picture differs from that of the reference picture, the video decoding device applies resampling for correcting the chroma signals to chroma signals of a reference block included in the reference picture such that the resolution and the chroma format of the chroma signals of the reference block match the resolution and the chroma format of the chroma signals of the current block (S1210).

The video decoding device generates predicted signals for the current block based on the inter-prediction information (S1212).

When separate resampling is applied to the chroma signals of the reference picture, the video decoding device may adjust a motion vector with respect to the chroma signals of the reference picture in consideration of resampling.

The video decoding device generates a reconstructed block by adding the predicted signals to the residual signals (S1214).

As described above, according to the present embodiment, it is possible to improve encoding efficiency by providing a video encoding/decoding method for performing inter-prediction on the current picture by resampling and referring to luma signals and chroma signals of a reference picture in video encoding and decoding for a frame having luma signals and chroma signals in various sample formats in one video sequence.

Hereinafter, a method for reducing memory consumption and delay of a video encoding/decoding device is described.

In screen content coding (SCC), a video encoding/decoding device adaptively transforms residual signals from an RGB or YUV color space to a YCgCo space using ACT as described above. For each transform unit (TU), the video encoding/decoding device may adaptively select one of two color spaces using one ACT flag. When the ACT flag is 1, the residual signals are encoded in the YCgCo space, and when the ACT flag is 0, TU residual signals are encoded in the original color space.

In the case of a video in which the sampling rate of the chroma format is 4:4:4, the video encoding/decoding device may use ACT.

Figure 13:
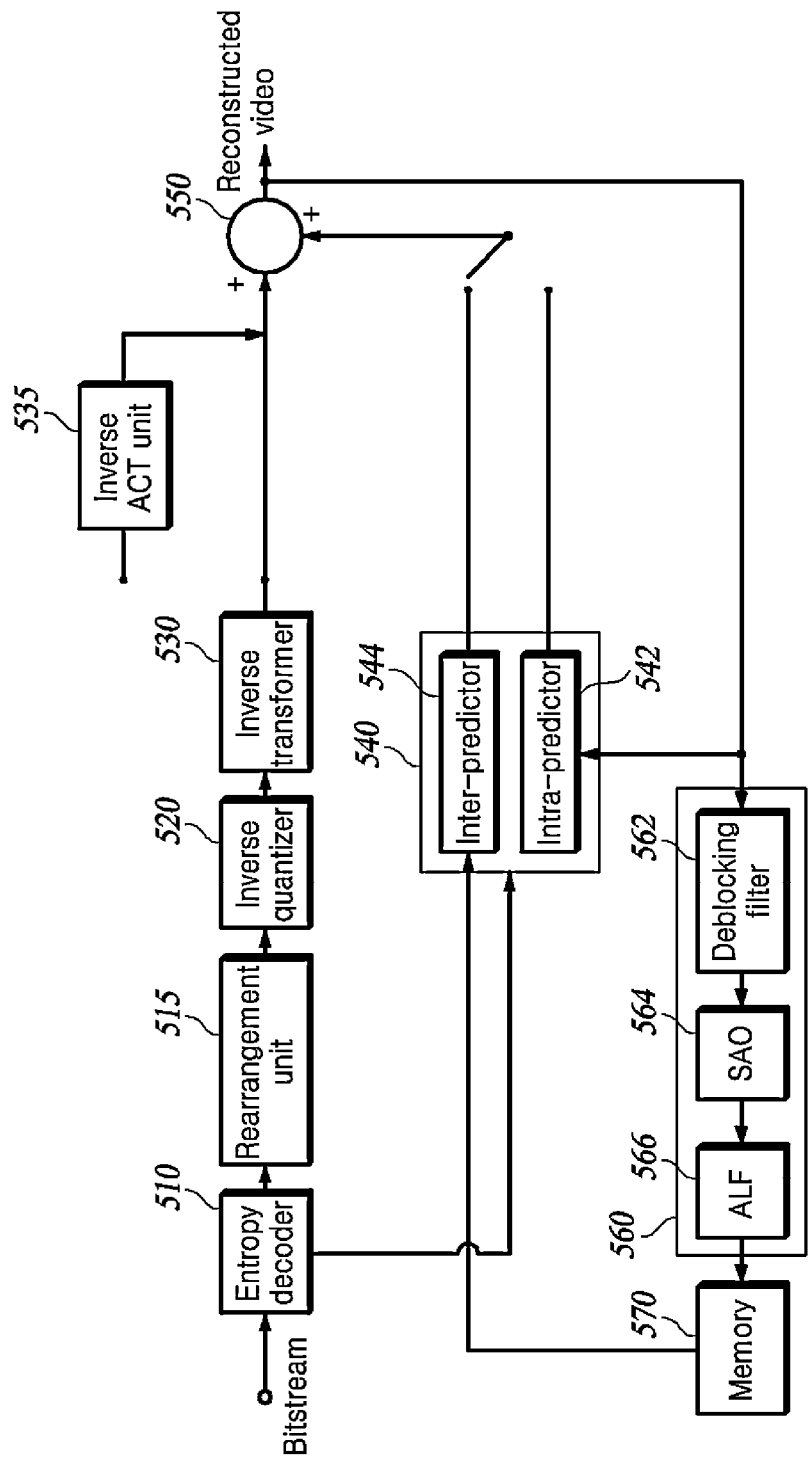
FIG. 13 is a block diagram of a video decoding device using ACT according to an embodiment of the present disclosure.

FIG. 13 is a block diagram of a video decoding device using ACT according to an embodiment of the present disclosure.

As illustrated in FIG. 13, the video decoding device may perform color space transform in a residual signal region. For example, in order to transform residual signals in the YCgCo space back to the original chroma space after inverse transform, an inverse ACT unit 535, which is an additional decoding module, is used.

The video encoding/decoding device uses one CU as a unit for transform processing unless the maximum transform size is smaller than the width or height of one CU. Accordingly, when the ACT flag is used, a flag for selecting a color space for one CU may be specified. Since the residual signals are additionally transformed, when there is at least one non-zero transform coefficient for a CU encoded by inter-prediction and IBC (Intra Block Copy), the video encoding/decoding device may use ACT. Further, the video encoding/decoding device may use ACT only when the same prediction mode, i.e., the DM mode, is selected for chroma signals and luma signals with respect to an intra-predicted CU.

The video encoding/decoding device may use forward and backward YCgCo color transform matrices as transform matrices for color space transform. In addition, an adjusted QP may be applied to the transformed residual signals to compensate for a change in the dynamic range of the residual signals before and after color transform.

ACT uses all three color components of the residual signals in the forward/backward color transform process. Accordingly, the video encoding/decoding device does not use ACT in the following two cases where the three color elements cannot be used.

First, when the luma and chroma color elements are encoded into separate tree structures, i.e., when luma and chroma samples in one CTU are split into different structures, and thus a CU of the luma tree includes only the luma component and a CU of the chroma tree includes only two chroma components, the video encoding/decoding device does not use ACT.

Second, when intra sub-partition prediction (ISP) is applied to the luma component, the video encoding/decoding device does not use ACT. Here, ISP refers to a technique of splitting a CU into two or four sub-rectangles in a horizontal or vertical direction according to the size of a block during intra-prediction.

Figure 14:
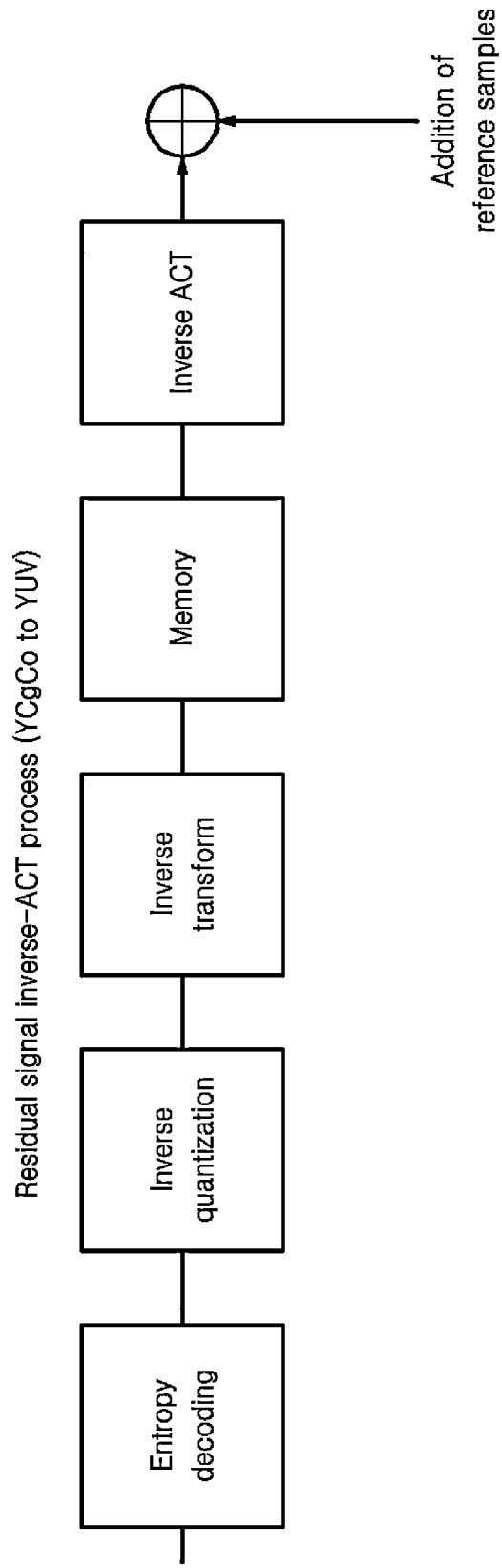
FIG. 14 is a conceptual diagram showing a video decoding process using ACT according to an embodiment of the present disclosure.

FIG. 14 is a conceptual diagram showing a video decoding process using ACT according to an embodiment of the present disclosure.

Since inverse-ACT requires all the three components, it requires a memory for intermediately storing values between inverse transform and the inverse-ACT. Since the video encoding/decoding device supports transform of up to 64 samples, inverse-ACT requires a maximum of 64×64×3 color elements.

Figure 15:
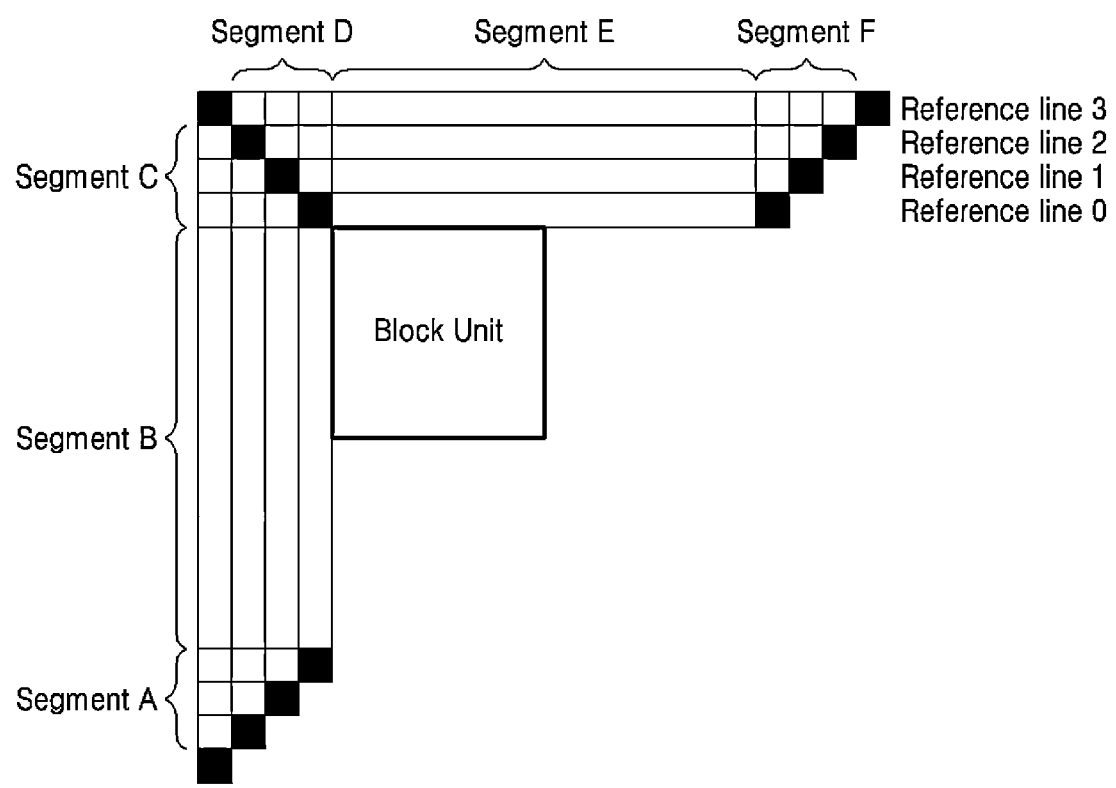
FIG. 15 is a conceptual diagram showing MRL according to an embodiment of the present disclosure.

FIG. 15 is a conceptual diagram showing MRL according to an embodiment of the present disclosure.

In the intra-prediction process, the video encoding/decoding device may use more reference lines by using multiple reference lines (MRL). When the MRL is applied, the video encoding/decoding device performs intra-prediction on a block unit using samples of two lines (reference line 1 and reference line 3 in the example of FIG. 15) added to the top and left sides. In order to select a reference line when the MRL is applied, an index (mrl_idx) indicating the reference line may be signaled. When a non-zero reference line index is signaled, the planar and DC modes are excluded from the intra-prediction modes.

Figure 16:
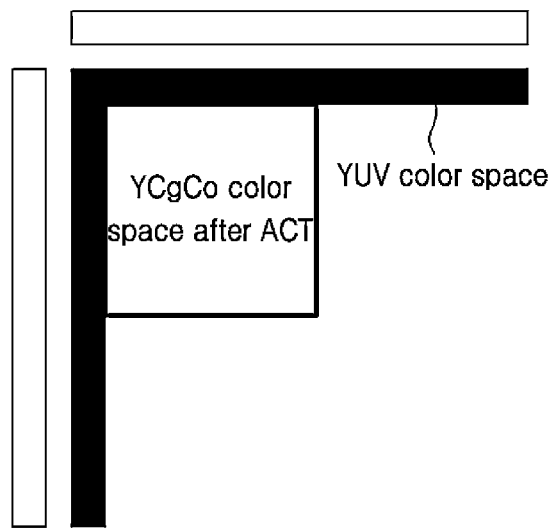
FIG. 16 is a diagram showing spaces of residual signals and a reference sample in ACT according to an embodiment of the present disclosure.

Hereinafter, a method of reducing memory consumption and delay required in a video encoding/decoding process when ACT is applied to an intra-predicted block is described. A region indicated by a YUV color space referred to in the example of FIG. 16 represents reference samples in reference line 0 (mrl_idx=0) prepared to perform intra-prediction of the current block. In addition, a region above the region and a region to the left of the region indicate reference samples of regions having non-zero reference lines.

Reference samples are expressed in the original YUV color space. However, when ACT is applied to the current block, residual signals in the block are expressed in the YCgCo color space. Therefore, in order to reconstruct the original signals, a process of inversely transforming the color space into the original YUV color space and then adding reference samples expressed in the YUV color space to reconstruct the original signals is required, as illustrated in FIG. 14. When the reference samples are added, the video encoding/decoding device may limit the value of a pixel to a sample value ranging from 0 to 255 using a clip operation.

As illustrated in FIG. 14, two or more transform processes (or inverse transform processes) are required before an addition operation is performed on reference samples, and thus memory consumption and delay may occur. In this case, the reference samples are restored in advance and stored in a memory buffer, and thus can be used last in an entire pipeline.

Figure 17:
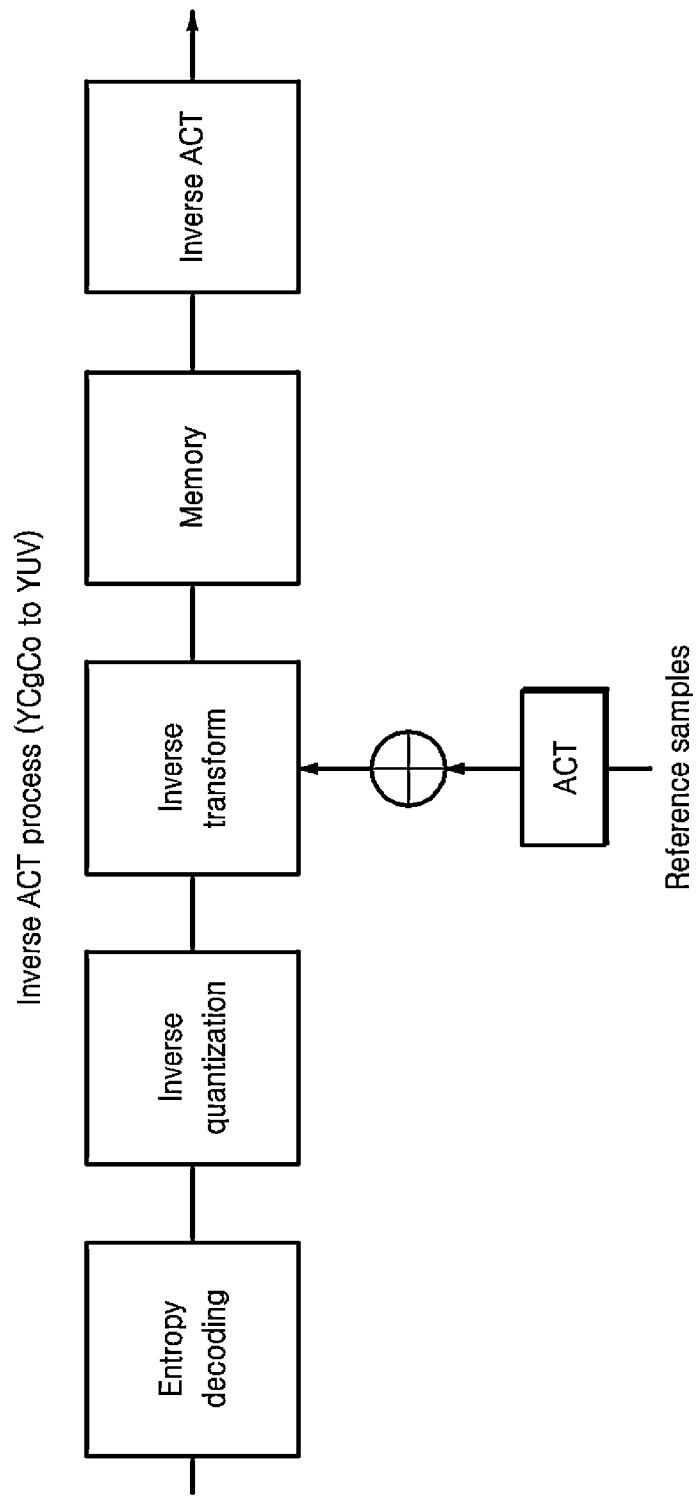
FIG. 17 is a diagram showing a pipeline for adding reference samples during intra-prediction in a YCgCo space according to an embodiment of the present disclosure.

FIG. 17 is a diagram of a pipeline for adding reference samples during intra-prediction in the YCgCo space according to an embodiment of the present disclosure.

The example of FIG. 17 shows a method in which reference samples on which ACT has been performed is stored in a buffer and then added to an inversely transformed residual signals of the YCgCo space, and the residual signals are finally restored using inverse-ACT. Although this method additionally requires ACT of the reference samples, it has an advantage that it can be performed independently/in parallel of/with conventional inverse-ACT.

Meanwhile, when an adjacent block including the reference samples has also been encoded using ACT, the values for the reference samples in the YCgCo color space are stored and used to reconstruct the current block. When reference samples are added, the video encoding/decoding device may limit the pixel value to a sample value ranging from 0 to 255 using a clip operation.

With respect to the method illustrated in FIGS. 14 and 17, if MRL is applied at the time of performing intra-prediction, memory capacity required for the video encoding/decoding device may increase. Therefore, in intra-prediction of a block to which ACT is applied, the video encoding/decoding device uses only the first line buffer of MRL (the reference line closest to the block, i.e., mrl_idx=0).

In the present embodiment, the video encoding/decoding device may determine whether to apply ACT and MRL by setting sps_act_enabled_flag and sps_mrl_enabled_flag on the SPS. When ACT is used by setting sps_act_enabled_flag to 1, the video encoding/decoding device sets sps_mrl_enabled_flag to 0 to use only the first line buffer of the MRL. Alternatively, when sps_mrl_enabled_flag is set to 0, the video encoding/decoding device uses sps_act_enabled_flag. Alternatively, when sps_mrl_enabled_flag is 1, the video encoding/decoding device sets sps_act_enabled_flag to 0.

In another embodiment of the present disclosure, instead of using a preset YCgCo transform matrix for ACT, the video encoding/decoding device may adaptively derive coefficients of a transform matrix using boundary pixels on the upper and left edges of the current CU and then apply the coefficients to the current CU. Here, as boundary samples used to derive the coefficients of the transform matrix, only sample of a buffer used for MRL may be used. For example, the video encoding/decoding device may use samples or some of the samples positioned in the first line, the second line and the fourth line on the upper and left sides.

In the present embodiment, the video encoding/decoding device performs transform after applying zero-out to a luma sample when the size of a transform kernel is greater than 16×16. Here, zero-out refers to a method of replacing all transform coefficients of sub-blocks other than an upper left sub-block with 0.

The video encoding/decoding device may set a zero-out region even when transforming a chroma block. In other words, the video encoding/decoding device may set transform coefficients of sub-blocks other than the upper left block to 0 and then perform transform on the chroma block.

A zero-out region may be set differently according to the sampling format of chroma signals. For example, when the chroma sample format of the current picture is 4:4:4, the video encoding/decoding device applies zero-out to blocks other than the upper left block and then transforms the chroma signals. Meanwhile, in the case of 4:2:2 and 4:2:0 formats, zero-out may not be applied.

In another embodiment of the present disclosure, when the chroma sample format of the current picture is 4:4:4, 4:2:2, and 4:2:0, the video encoding/decoding device may apply zero-out to blocks other than the upper left block and then transform the chroma signals.

In another embodiment of the present disclosure, the video encoding/decoding device may determine a zero-out region of a chroma sample block as a region obtained by reducing a zero-out region of luma signals by half in the horizontal and vertical directions.

In another embodiment of the present disclosure, when the chroma sample format is 4:2:0 and 4:2:2, the video encoding/decoding device may determine a zero-out region of a luma block as a region obtained by reducing a zero-out region of luma signals by half in the horizontal and vertical directions.

Zero-out can be applied to compensate for considerable increase in the amount of computation as the size of the transform kernel increases. The complexity is reduced when zero-out is applied, but there is some loss in terms of compression efficiency. In particular, when zero-out is forcibly applied to an image with a lower QP, i.e., a higher bitrate, complexity is low but a data loss rate increases, and the frequency of use of a transform kernel of 32×32 or more is considerably reduced whereas the frequency of use of a transform kernel having a size less than 32 increases. Accordingly, the video encoding/decoding device may not take advantage of a gain in coding efficiency which can be obtained as a large transform kernel is used.

Hereinafter, to solve such problem, a method for controlling zero-out is proposed.

In the present embodiment, the video encoding/decoding device may control zero-out by adaptively transmitting use_tr_zero_out_flag in units of SPS, PPS, picture header, slice header, CU, or TU.

In another embodiment of the present disclosure, no_tr_zero_out_constraint_flag may be added to a general constraint information syntax. When this flag is 1, the video encoding/decoding device may restrict the use of zero-out.

In another embodiment of the present disclosure, zero-out may be controlled according to a profile/level. Since the level is a general measure indicating the performance level of a video encoding/decoding device, zero-out can be used only below a specific level. For example, the video encoding/decoding device may set a level limit such that zero-out can be used only at level 3 or lower.

In the present embodiment, when low-frequency non-separable transform (LFNST) is applied, the video encoding/decoding device sets zero-out regions of luma and chroma samples to be the same. Here, LFNST is applied between the transformer 140 and the quantizer 145 in the case of a video encoding device and is applied between the inverse quantizer 520 and the inverse transformer 530 in the case of a video decoding device to reduce the amount of computation.

In another embodiment of the present disclosure, when LFNST is applied to chroma samples, the video encoding/decoding device may set an LFNST zero-out region of the chroma samples differently from an LFNST zero-out region of luma samples. For example, the LFNST zero-out region of the chroma samples may be set to half the horizontal and vertical lengths of the LFNST zero-out region of the luma samples.

Further, a zero-out region may be determined according to a sampling format of chroma signals. When the sampling format of the chroma signals of the current picture is 4:4:4, the video encoding/decoding device sets the same zero-out region as that of luma signals as the zero-out region of the chroma signals. When the sampling format is 4:2:0, a different zero-out region may be set. For example, the zero-out region of the chroma samples may be set to half the horizontal and vertical lengths of the zero-out region of the luma samples.

In another embodiment of the present disclosure, the video encoding/decoding device may set the same zero-out region as that of the luma signals as a zero-out region of the chroma signals when the sampling format of the chroma signals is 4:2:0. The video encoding/decoding device may set twice the horizontal and vertical lengths of the zero-out region of a luma sample as a zero-out region of the chroma signals when the sampling format of the chroma signals is 4:4:4.

Meanwhile, when the video decoding device is implemented as hardware (H/W), a pipeline may be configured such that parallel processing of each encoding technique can be performed. In this case, the size of a transform block determines the maximum block size of the pipeline and may become a bottleneck of the entire pipeline. This is because it is possible to design other hardware blocks constituting the pipeline by dividing the blocks into arbitrary small blocks, but it is difficult to apply such a division method to a transform block. Since the video encoding/decoding device uses transform of a maximum of 64×64 block, the hardware video decoding device may require a pipeline having a minimum size of 64×64 block.

Using a virtual pipeline data unit (VPDU), when a block divided within a 64×64 block is completely present within one VPDU or spans other VPDUs, the video encoding/decoding device follows restrictions that the corresponding block must completely occupy the VPDU. Therefore, it is important to reduce delay necessary for block transform in terms of reducing delay in the entire pipeline and memory consumption.

Hereinafter, a method of decoding an encoded bitstream to which parallel decoding, such as multi-slice, multi-tile, and wavefront, is not applied (hereinafter referred to as a "single-core bitstream") using multiple cores with low latency is described.

Figure 18:
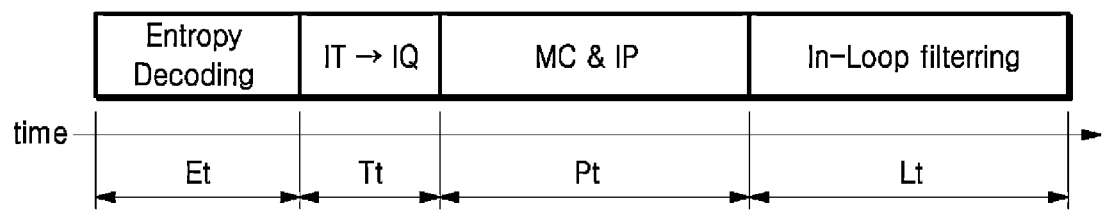
FIG. 18 is a schematic diagram showing a decoding process according to an embodiment of the present disclosure.

FIG. 18 is a schematic diagram showing a decoding process according to an embodiment of the present disclosure.

The example of FIG. 18 schematically shows a decoding process through which a single reconstructed image is generated from a bitstream. Here, entropy decoding is a step of parsing a bitstream performed by the entropy decoder 510, IQ represents inverse quantization performed by the inverse quantizer 520, IT represents inverse transform performed by the inverse transformer 530, MC represents motion compensation, IP represents intra-prediction, and in-loop filtering indicates the deblocking filter 562/ALF 564/SAO filter 566. In addition, Et, Tt, Pt, and Lt indicated in each step are times required for each step and have a relationship of Pt to Lt>Et>Tt in general.

Bitstreams to which parallel decoding is not applied must be sequentially decoded as shown in the figure above even if multiple cores are used. Therefore, a time taken to reconstruct one image is Et+Tt+Pt+Lt.

Hereinafter, a process of applying multiple cores to decoding of a single-core bitstream is described with reference to FIG. 19.

Figure 19:
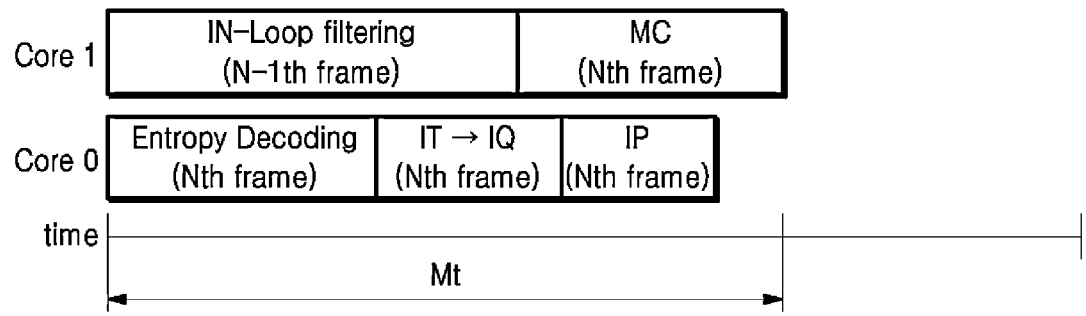
FIG. 19 is a diagram showing a process of decoding a single-core bitstream using multiple cores according to an embodiment of the present disclosure.

FIG. 19 is a diagram showing a process of decoding a single-core bitstream using multiple cores according to an embodiment of the present disclosure.

In the present embodiment, the video decoding device may apply multiple cores to decoding of a single-core bitstream based on a time required for each decoding module (in-loop filtering, MC/IP, entropy decoding, and IT/IQ). In other words, a decoding module may be allocated to each core in consideration of decoding time and dependency between decoding modules. For example, entropy decoding/IT/IQ/IP have interdependence, and in-loop filtering needs to be terminated before inter-prediction is performed on the next image and thus can be regarded as having relatively low dependency. In addition, when entropy decoding is finished, MC can be performed at any time. As described above, the decoding time for each decoding module is in the order of Pt to Lt>Et>Tt. In consideration of all these factors, entropy decoding, IT/IQ, and IP of the N-th frame are allocated to core 0. In addition, while the corresponding process is being performed, in-loop filtering of the (N−1)-th frame and MC of the N-th frame are allocated to core 1. As a decoding module is allocated to each core in this way, the decoding time of the single-core bitstream can be significantly reduced to about Mt, as illustrated in FIG. 19.

Figure 20:
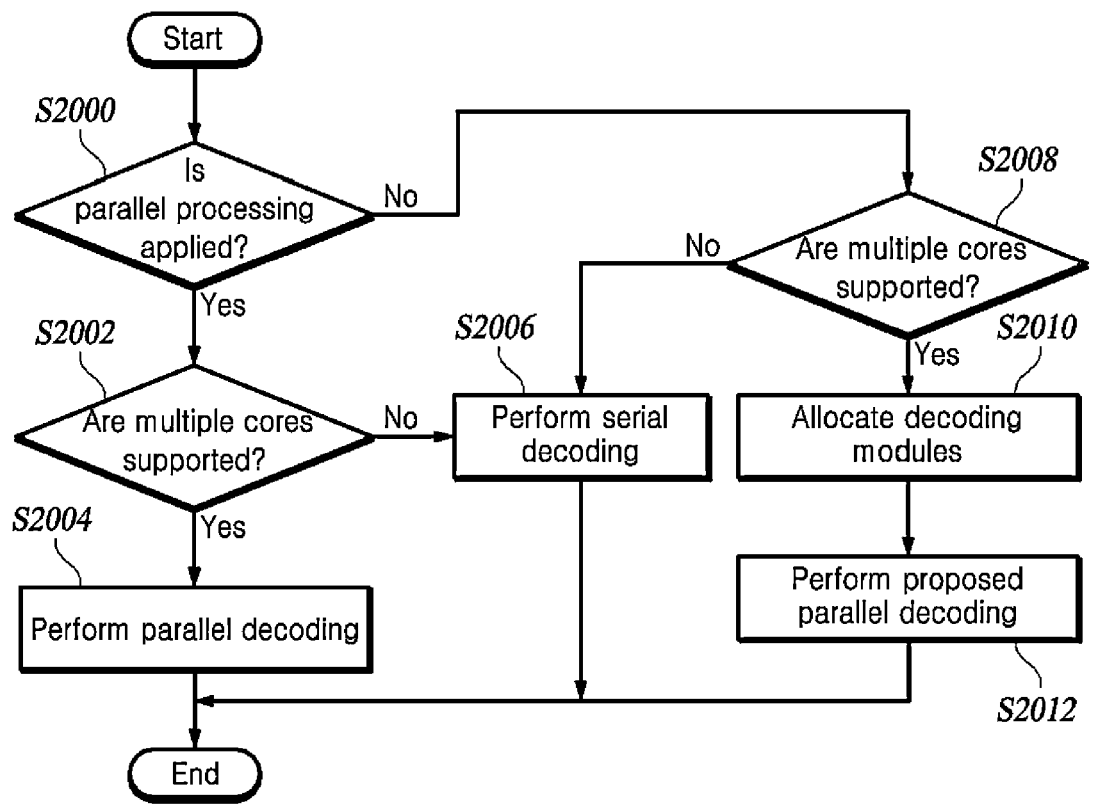
FIG. 20 is a diagram showing an operation of a hardware video decoding device according to an embodiment of the present disclosure.

FIG. 20 is a diagram illustrating an operation of a hardware video decoding device according to an embodiment of the present disclosure.

The video decoding device may perform parallel or serial decoding according to whether parallel processing is applied or whether multiple cores are supported.

The video decoding device determines whether parallel processing is applied to a bitstream (S2000).

If parallel processing is applied, the video decoding device determines whether multiples cores are supported (S2002). The video decoding device performs a normal parallel decoding process if multiple cores are supported (S2004) and performs a normal serial decoding process if multiple cores are not supported (S2006).

Even when parallel processing is not applied, the video decoding device determines whether multiple cores are supported (S2008). If multiple cores are not supported, the video decoding device performs the normal serial decoding process (S2006).

If multiple cores are supported, the video decoding device allocates decoding modules to each core in consideration of decoding time and dependency between decoding modules (S2010) and then performs the proposed parallel decoding process as illustrated in FIG. 19 (S2012).

In the present embodiment, the method of reducing memory consumption and delay performed by the video decoding device as described above may be equally applied to the video encoding device.

As described above, according to the present embodiment, it is possible to decrease a bit rate for various contents such as game broadcasting, 360-degree video streaming, VR/AR videos, and online lectures, reduce the burden on a network and energy consumption of a reproduction device performing video decoding, and enable rapid decoding by providing a video encoding/decoding method for reducing memory consumption and delay in encoding/decoding processes.

In each flowchart according to the embodiment, it is described that respective processes are executed in sequence, but the present disclosure is not limited thereto. In other words, since it is applicable that the processes described in the flowchart are changed and executed or one or more processes are executed in parallel, the flowchart is not limited to a time series order.

Meanwhile, various functions or methods described in the present disclosure may also be implemented by instructions stored in a non-transitory recording medium, which may be read and executed by one or more processors. The non-transitory recording medium includes, for example, all types of recording devices storing data in a form readable by a computer system. For example, the non-transitory recording medium includes storage media such as an erasable programmable read only memory (EPROM), a flash drive, an optical driver, a magnetic hard drive, and a solid state drive (SSD).

Although embodiments of the present disclosure have been described for illustrative purposes, those having ordinary skill in the art should appreciate that various modifications, additions, and substitutions are possible, without departing from the idea and scope of the claims Therefore, embodiments of the present disclosure have been described for the sake of brevity and clarity. The scope of the technical idea of the present embodiments is not limited by the illustrations. Accordingly, one of ordinary skill would understand the scope of the claims is not to be limited by the above explicitly described embodiments but by the claims and equivalents thereof.

REFERENCE NUMERALS

| | |
|---|---|
| 105: down-sampler | 120: predictor |
| 140: transformer | 145: quantizer |
| 195: resampler | |
| 520: inverse quantizer | 530: inverse transformer |
| 535: inverse ACT unit | 540: predictor |
| 575: resampler | |

What is claimed is:

1. A method of decoding a video sequence of pictures for allowing the pictures in the video sequence to have different chroma formats, the method comprising:

decoding, from a bitstream, chroma format information for the video sequence, and a flag indicating whether spatial resolutions of the pictures in the video sequence is capable of being changed;

decoding, from the bitstream, at least one first syntax element for specifying a size of a luma picture, which comprises luma samples of a current picture belonging to the video sequence, to thereby determine the size of the luma picture; and determining a size of a chroma picture, which comprises chroma samples of the current picture, based on the flag, wherein, when the flag indicates that the spatial resolutions of the pictures in the video sequence is capable of being changed, the size of the chroma picture is set based on at least one second syntax element included in the bitstream for specifying the size of the chroma picture, and wherein, when the flag indicates that the spatial resolutions of the pictures in the video sequence is not capable of being changed, the size of the chroma picture is set equal to a size defined by the size of the luma picture and the chroma format information for the video sequence.

2. The method of claim 1, wherein the at least one second syntax element includes an additional chroma format information to be applied to the current picture, and wherein the size of the chroma picture is set equal to a size defined by the size of the luma picture and the additional chroma format information.

3. The method of claim 1, wherein the at least one second syntax element includes:
- a syntax element for specifying a width of the chroma picture, and
- a syntax element for specifying a height of the chroma picture.

4. The method of claim 1, wherein, when an enabled flag indicates that the spatial resolutions of the pictures in the video sequence is capable of being changed, at least one coding tool of Adaptive Color Transform (ACT), Temporal Motion Vector Predictor (TMVP), Decoder-side Motion Vector Refinement (DMVR) and Prediction Refinement with Optical Flow (PROF) is disabled.

5. A method of encoding a video sequence of pictures for allowing the pictures in the video sequence to have different chroma formats, the method comprising:
- encoding, into a bitstream, chroma format information for the video sequence, and a flag indicating whether spatial resolutions of the pictures in the video sequence is capable of being changed;
- determining a size of a luma picture, which comprises luma samples of a current picture belonging to the video sequence, and encoding, into the bitstream, at least one first syntax element for specifying the size of the luma picture; and
- based on the flag, determining a size of a chroma picture, which comprises chroma samples of the current picture and encoding at least one second syntax element for specifying the size of the chroma picture,
- wherein, when the flag indicates that the spatial resolutions of the pictures in the video sequence is capable of being changed, the at least one second syntax element is encoded into the bitstream for specifying the size of the chroma picture,
- wherein, when the flag indicates that the spatial resolutions of the pictures in the video sequence is not capable of being changed, the at least one second syntax element is not encoded and the size of the chroma picture is set equal to a size defined by the size of the luma picture and the chroma format information for the video sequence.

6. A method of providing encoded data of a video sequence of pictures to a video decoding apparatus, the method comprising:
- generating a bitstream, by encoding the video sequence of pictures for allowing the pictures in the video sequence to have different chroma formats; and
- transmitting the bitstream to the video decoding apparatus,
- wherein generating the bitstream comprises:
  - encoding, into a bitstream, chroma format information for the video sequence, and a flag indicating whether spatial resolutions of the pictures in the video sequence is capable of being changed;
  - determining a size of a luma picture, which comprises luma samples of a current picture belonging to the video sequence and encoding, into the bitstream, at least one first syntax element for specifying the size of the luma picture; and
  - based on the flag, determining a size of a chroma picture, which comprises chroma samples of the current picture and encoding at least one second syntax element for specifying the size of the chroma picture,
- wherein, when the flag indicates that the spatial resolutions of the pictures in the video sequence is capable of being changed, the at least one second syntax element is encoded into the bitstream for specifying the size of the chroma picture,
- wherein, when the flag indicates that the spatial resolutions of the pictures in the video sequence is not capable of being changed, the at least one second syntax element is not encoded and the size of the chroma picture is set equal to a size defined by the size of the luma picture and the chroma format information for the video sequence.

* * * * *